UNITED STATES PATENT OFFICE.

THOMAS SWARTWOUT, OF CHICAGO, ILLINOIS, ASSIGNOR OF ONE-HALF HIS RIGHT TO THOMAS C. LAMB, OF SAME PLACE.

IMPROVEMENT IN ARTIFICIAL-MARBLE VENEERING.

Specification forming part of Letters Patent No. 212,068, dated February 4, 1879; application filed March 4, 1878.

*To all whom it may concern:*

Be it known that I, THOMAS SWARTWOUT, of the city of Chicago, in the county of Cook and State of Illinois, have invented a new and useful compound called "Marble-Veneering," which compound is fully described in the following specification.

The invention has for its object to provide a composition for coating wood, iron, or any surface in imitation of the different kinds of marble, which shall be cheap, durable, and easily applied.

The invention consists in preparing a composition of marble-dust, barytes, zinc, and various kinds of colors, prepared as follows: I take fine marble-dust, barytes, and zinc, in equal parts, mixed with as little water as will mix to a stiff paste. I then dissolve one pound of fine glue and two ounces of sugar of lead in one gallon of water. With the solution I add to the compound a sufficient quantity to thin it down to the consistency of cream. I prepare my colors by mixing each color in separate vessels with glue-water, taking care to keep it in a warm state. I next force, by the use of a syringe, a few drops of each color into a cup; then pour it upon the surface to be ornamented. As it is poured the different colors blend together so as to form the grains of marble, using the kind of colors each time to represent the kind of marble desired; then allow time to dry. Next grind with emery cloth or paper, and make smooth with pumice-stone. Then it is ready to be finished by any of the well-known means.

I do not desire to confine myself to the exact proportions of the ingredients used in the compound. If the marble-dust is very fine, I use less of the barytes and zinc. The more marble-dust used the more it will be like the real marble, always using judgment in regard to the amount used of the different materials, also in the amount of the colors used.

I am aware of patents using composition and colors to produce imitations of marble.

I do not claim upon the composition.

The essential feature of my invention, therefore, is the method of placing the colors in the compound, before pouring it onto the surface, by the use of a syringe, the use of marble-dust, barytes, zinc, and mineral colors, mixed with glue-water and sugar of lead, and afterward commingled by the use of the syringe, which forces the colors through and through the compound, thus avoiding the necessity of destroying the colors in grinding down the surface, which is the case in the old way of dropping in the colors after pouring on the compound, which colors float on the surface thereof and dry unevenly. The composition thus formed is cheap, durable, ornamental, and can be applied to wooden and other surfaces in imitation of marble.

I claim as my invention—

The method of placing the colors in a composition for artificial marble by the use of a syringe before pouring it onto the surface to be ornamented, consisting of the combination prepared as hereinbefore described—that is to say, mixed, while separate, with warm water, glue and sugar-of-lead water, and afterward commingled, substantially as and for the purposes above set forth.

THOMAS SWARTWOUT.

Witnesses:
J. W. PRINCE,
WM. HYDE.